J. Batchelder,
Turning Bungs.
N° 44,251. Patented Sep. 13, 1864.

Witnesses:
Inventor:
John Batchelder.

J. Batchelder,
Turning Bungs.

N° 44,251.  Patented Sep. 13, 1864.

Witnesses:  
Inventor:  
John Batchelder

UNITED STATES PATENT OFFICE.

JOHN BATCHELDER, OF CANAAN, NEW HAMPSHIRE, ASSIGNOR TO ABRAM BATCHELDER, OF LOWELL, MASSACHUSETTS.

IMPROVEMENT IN MACHINES FOR MAKING BUNGS.

Specification forming part of Letters Patent No. 44,251, dated September 13, 1864.

*To all whom it may concern:*

Be it known that I, JOHN BATCHELDER, of Canaan, in the county of Grafton and State of New Hampshire, have invented certain new and useful Improvements in Machines for Turning Taps and Bungs; and I do hereby declare that the following is a full, clear, and exact description of the construction and operation of the same, reference being had to the annexed drawings, making part of this specification, in which—

Figure 2:
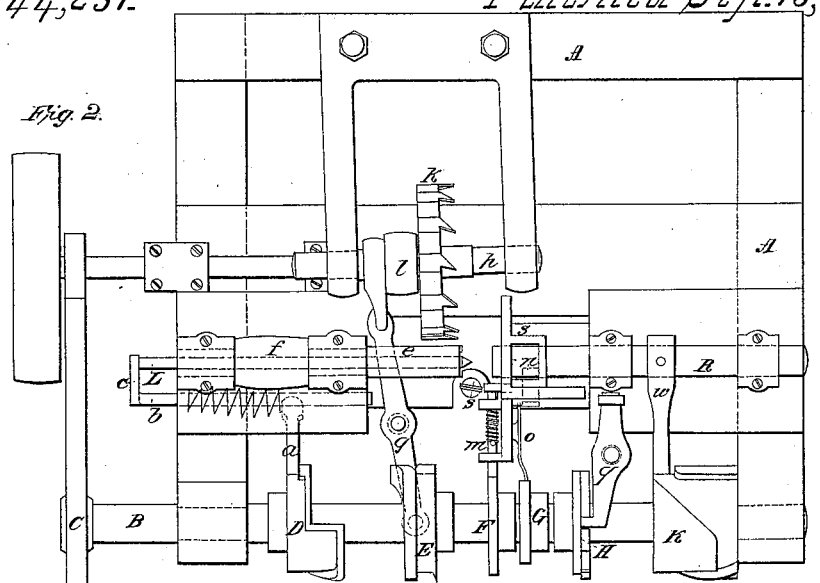
Figure 1:
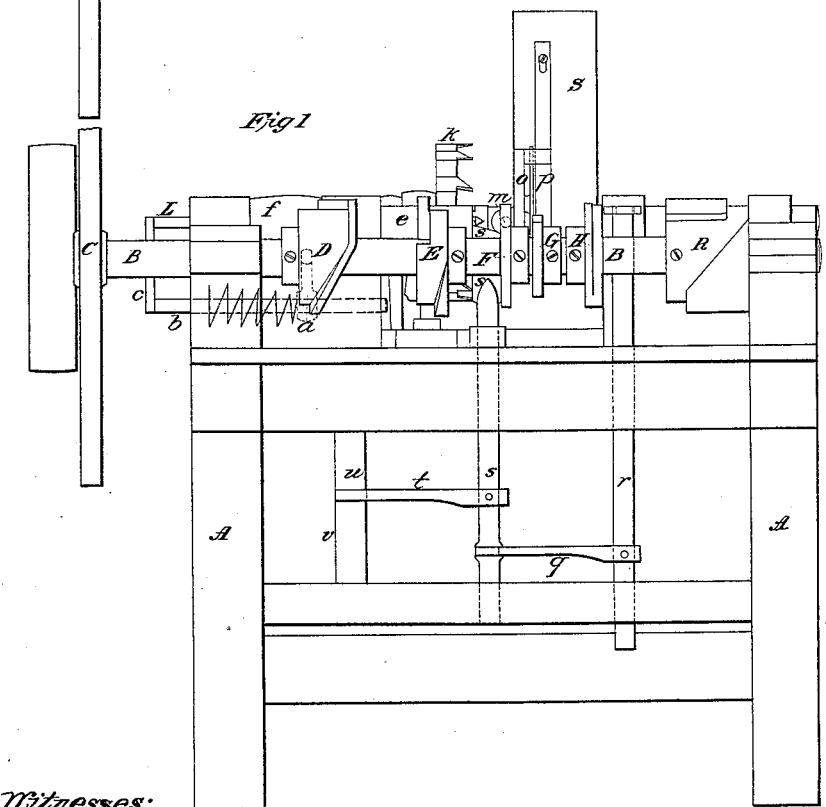
Figure 4:
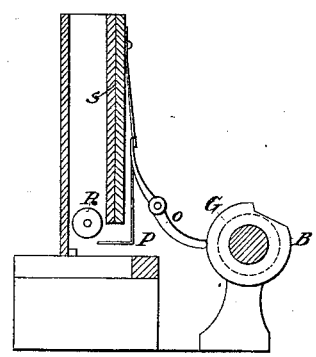
Figure 5:
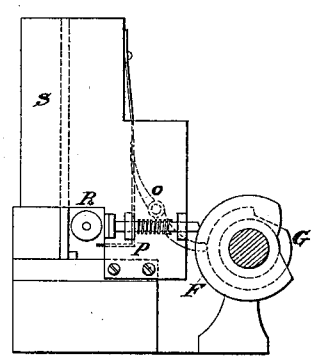
Figure 3:
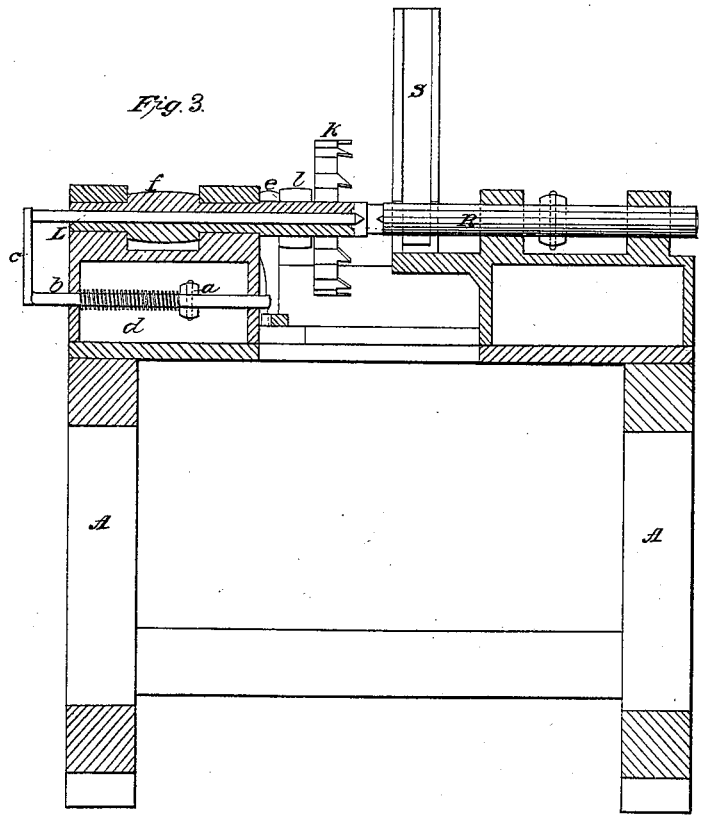

Figure 1 is a longitudinal elevation. Fig. 2 is a horizontal plan of the same. Fig. 3 is a perpendicular section through the spindles and feed-box. Fig. 4 is a section through the feed-box and at right angles to the spindles. Fig. 5 is an elevation of the feed-box at right angles to the spindles.

The same letters refer to the same parts in all the drawings.

A represents the frame of the machine. B is the main shaft, on which are arranged the cams D, E, F, G, H, and K, by which the different parts of the machine are operated. On one end of said shaft B is the pulley C, to which the power is applied.

D is a cam, formed as shown in Fig. 2, which, by means of the arm $a$ on the sliding shaft $b$, moves the same forward and back in its bearings.

To the outer end of the sliding shaft $b$ is another arm, $c$, which is attached to the outer end of the live-spindle L, and causes the same to slide longitudinally in the manner and to the same extent as the sliding shaft $b$.

Upon the sliding shaft $b$ is a spiral spring, $d$, which holds the arm $c$ in its place, in connection with the spindle L, and assists the arm $a$ in following the cam D, and communicates motion, in connection with the cam D, to the sliding shaft $b$ and live-spindle L. The spindle L runs through the inside of the pulley-shaft $e$, as in a sleeve, and the two are retained in their relative positions by a spline. The shaft $e$ has on it a pulley, $f$, by means of which an independent revolving motion is given to the shaft $e$ and spindle L.

E is a cam, formed as shown in Figs. 1 and 2, which, by means of the lever $g$, one end of which is connected with the cam E and the other with an arm or clutch on the shaft $h$, whereby a sliding motion in its bearings is given to the shaft $h$ and the cutter $k$ thereon The cutter $k$ has an independent revolving motion given to it by the pulley $l$ and suitable bits, and is supported in its bearings at the proper distance to cut off the rough edges and corners of the blocks, when properly centered on the spindles L and R.

F is a cam, formed as shown in Fig. 5, which operates the slide $m$, one end of which bears on said cam, and the other has a scraper, $n$, attached to it, and is driven by the cam against the spindle R, behind the tap or bung when turned, and when the spindle R is withdrawn it scrapes the tap from the centers on the spindles and allows it to fall from the machine, on which slide is a spiral spring to withdraw it when not operated by the action of the cam F.

G is a cam, formed as shown in Figs. 4 and 5, which operates the lever $o$, and by means thereof withdraws and releases the spring $p$, bent at a right angle, as shown in Figs. 4 and 5, the end of which spring when released passes through an opening in the feed-box S, and forces the blocks into the corner of the feed-box S and in a line with the centers of the spindles, and retains them there till they are fastened on the centers by the operation of the cam K, operating the spindle R, and the spring $d$ and cam D operating the spindle S.

H is a cam, formed as shown in Fig. 2, which, by means of the arms $q$ and $q'$, attached to the sliding shaft $r$, operates the finishing-tool $s$ by its sliding shaft $s'$ raising the tool $s$ to do the cutting necessary to finish the surface of the tap or bung and lowering it out of the way that the tap or bung may be removed by the scraper $w$. Upon this sliding shaft $s'$ is an arm, $t$, which bears against the inclined side $u$ of the upright $v$ or runs in a similar inclined groove therein, whereby, when the tool is raised by the operation of the cam H and its connections, it is partially rotated on its axis, and as the tap or bung is driven forward toward the tool $s$ by the motion of the spindle R, it cuts the bung to the taper desired.

K is a cam, formed as shown in Figs. 1 and 2, which is connected with the spindle R by the arm or connecting-rod $w$, and as the cam revolves gives a longitudinal sliding motion to the spindle R in its bearings.

R is a spindle, sliding in suitable bearings, and operated so as to slide longitudinally by the cam K, and between which and the spindle L the block to be turned is held—the block having descended through the feed-box S, and being driven by the spring $p$ to the corner of the feed-box, where it is in line with the center of the spindles.

S is a feed-box, in which are placed the blocks to be turned, they having been sawed to the proper size, the bottom and the side opposite the shaft B forming a right angle at such a height and position with reference to the spindles L and R that, one of the blocks being placed in it, its center line will be in a line with the centers of the spindles, as shown by the dotted red line in Fig. 4, the spindle R being moved by the cam K through the lower part of the feed box, carrying with it the block to the cutters $k$ and $s$. To the side of this feed box S is attached the spring $p$, by which the blocks are forced into the said angle of the feed-box and which is withdrawn therefrom by the cam G operating on the lever $o$.

The notch in the cam D (shown at $g$ in Fig. 2) is so made that, in case one of the blocks should stick on the spindle, when the arm A passes that point, the tension of the spring $d$ will give the spindle L a motion smart enough to remove the block.

The operation of the machine is as follows: The feed-box being filled with blocks which have previously been sawed to the proper size, with one of the blocks resting at the bottom of the feed-box, power is applied to the pulley C, which causes the shaft B to revolve, carrying with it the cams D, E, F, G, H, and K. The revolution of the cam K causes the spindle R to be brought against the end of the block, and at the same time the spring $p$ is released and forces the block into the angle between the side and bottom of the feed-box with its center in line with the centers of the spindles L and R, the scraper $n$ being withdrawn by the spring on the slide $m$. The further revolution of the shaft B carries the spindle R and the block partly through the lower end of the feed-box, and at the same time the spring $d$ on the sliding shaft $b$, being released by the action of the arm $c$ on the cam D, forces the spindle L into the opposite end of the block with sufficient force to hold the block while being turned, and centering by the operation of the machine alone. The further revolution of the shaft B causes the spindle R, with the block held between it and the spindle L, through the feed-box, when by the action of the cam G the spring $p$ is withdrawn, and by the action of the cam F the scraper $n$ is pressed against the spindle R behind the block, and by the action of the cam E the cutter $k$ is brought so as to cut off the corners and rough edges of the block, and the cutter $s$ is raised up so as to smooth the surface of the tap or bung, and at the same time the arm $t$ bears against the inclined side $u$ of the upright $v$ and gives the shaft $s'$ a revolving motion on its own axis, whereby the edge of the tool is turned inward and causes it to cut the tap or bung to the desired taper. The further revolution of the shaft B causes the spindle R to be withdrawn—the spindle L remaining stationary—and the now, finished tap or bung is caught by the scraper and removed from the spindle and falls from the machine, and as the spindle R is wholly withdrawn another block descends to the bottom of the feed-box and the same operation is again repeated, as above set forth. The cutter $k$ and the spindle L and pulley $f$ and pulley-shaft $e$, having independent motions, are driven by other power, with such belts as are requisite, at any desired speed.

What I claim as my invention, and desire to secure by Letters Patent, is—

1. The spindle L, in combination with the hollow pulley-shaft $e$, spring $d$, arm $a$, sliding shaft $b$, and cam D, or their equivalents, substantially as described, and for the purposes set forth.

2. The inclined plane or groove $u$, in combination with the cam H, the cutter $s$, cutter-shaft $s'$, and the devices for operating the same, or their equivalents, substantially as described, for the purposes set forth.

3. The feed-box S, in combination with the spring $p$, lever $o$, and cam G, or their equivalents, for centering the blocks automatically, substantially, as described, for the purposes set forth.

JOHN BATCHELDER.

Witnesses:
M. P. HALL,
S. N. BELL.